United States Patent
Maeda et al.

(10) Patent No.: US 7,645,838 B2
(45) Date of Patent: Jan. 12, 2010

(54) CONJUGATED NON-AROMATIC DIENE OR DIENOPHILIC COMPOUND-MODIFIED POLYPHENYLENE ETHERS

(75) Inventors: Mutsumi Maeda, Chiba (JP); Hiroaki Adachi, Kanagawa (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 0 days.

(21) Appl. No.: 10/858,180

(22) Filed: Jun. 1, 2004

(65) Prior Publication Data

US 2004/0225082 A1 Nov. 11, 2004

Related U.S. Application Data

(63) Continuation of application No. 09/869,660, filed on Jun. 29, 2001, now Pat. No. 6,841,629.

(51) Int. Cl.
  *C08G 65/324* (2006.01)
  *C08L 71/12* (2006.01)
(52) U.S. Cl. ....................................... 525/391
(58) Field of Classification Search ........................ None
  See application file for complete search history.

(56) References Cited

U.S. PATENT DOCUMENTS

| | | | |
|---|---|---|---|
| 3,257,357 A | 6/1966 | Stamatoff | |
| 3,257,358 A | 6/1966 | Stamatoff | |
| 3,306,874 A | 2/1967 | Hay | |
| 3,306,875 A | 2/1967 | Hay | |
| 3,432,466 A * | 3/1969 | Hay | 526/71 |
| 4,654,405 A | 3/1987 | Jalbert et al. | |
| 4,816,515 A * | 3/1989 | Weiss | 525/68 |
| 4,888,397 A | 12/1989 | Van der Meer et al. | 525/68 |
| 4,994,525 A | 2/1991 | Brown | 525/66 |
| 5,015,698 A | 5/1991 | Sybert et al. | 525/391 |
| 5,028,656 A | 7/1991 | Okabe et al. | 524/540 |
| 5,159,027 A | 10/1992 | Kanayama et al. | |
| 5,219,940 A | 6/1993 | Nakano | 525/133 |
| 5,310,820 A * | 5/1994 | Nelissen et al. | 525/391 |
| 5,326,813 A * | 7/1994 | Okada et al. | 524/508 |
| 5,338,796 A | 8/1994 | Vianello et al. | 525/66 |
| 5,523,360 A * | 6/1996 | Jelenic et al. | 525/397 |
| 5,631,070 A * | 5/1997 | Nishii et al. | 428/220 |
| 6,054,516 A * | 4/2000 | Yoshida et al. | 524/147 |

FOREIGN PATENT DOCUMENTS

| | | | |
|---|---|---|---|
| EP | 226002 A1 * | 6/1987 | |
| EP | 0451562 A2 | 10/1991 | |
| EP | 451563 A2 | 10/1991 | |
| EP | 546497 A | 6/1993 | |
| JP | 50-51197 | 5/1975 | |
| JP | 50-150798 | 12/1975 | |
| JP | 63-152628 | 6/1988 | |
| JP | 63-503392 A | 12/1988 | |
| JP | 3-35020 A | 2/1991 | |
| JP | 03-285917 A * | 12/1991 | |
| JP | 04-239036 A * | 8/1992 | |
| JP | 4-239036 A | 8/1992 | |
| JP | 5-148357 | 6/1993 | |
| JP | 63-500803 A | 3/1998 | |
| WO | WO 00/52074 | 9/2000 | |

OTHER PUBLICATIONS

CAPLUS accession No. 1994:436539 for the Kobunshi Ronbunshi artilce by Mitui et al., vol. 51, No. 3, abstract.*
CAPLUS accession No. 1994:510074 for the Kobunshi Ronbunshu artilce by Takayama et al., vol. 51, No. 7, abstract.*

(Continued)

*Primary Examiner*—Robert Sellers
(74) *Attorney, Agent, or Firm*—Dickstein Shapiro LLP

(57) ABSTRACT

A modified polyphenylene ether resin is provided which is a product of the reaction of 100 parts by weight of (A) a polyphenylene ether having a main chain structure of the following formula (1):

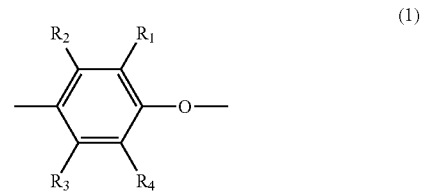

(wherein $R_1$ and $R_4$ each independently represents hydrogen, a primary or secondary lower alkyl, a phenyl, an aminoalkyl or a hydrocarbonoxy, and $R_2$ and $R_3$ each independently represents hydrogen, a primary or secondary lower alkyl or a phenyl), with 0.01 to 10.0 parts by weight of (B) a modifier selected from conjugated non-aromatic diene compounds, dienophilic compounds having one dienophile group and precursors of the diene or dienophilic compounds, wherein the number of rearrangement structures each represented by the following formula (2):

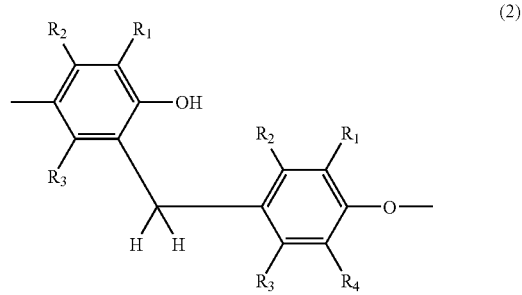

(wherein $R_1$, $R_2$, $R_3$, and $R_4$ have the same meanings as defined above in the formula (1)) is less than 0.01 per 100 phenylene ether units of the formula (1).

9 Claims, No Drawings

OTHER PUBLICATIONS

Chemical abstracts accession No. 1994:436539, Mitui et al., Kobonshi Ronbunshu (1994), vol. 51, No. 3, pp. 157-166.

Chemical abstracts acession No. 1994:510074, Takayama et al., Kobunshi Ron bunshu (1994), vol. 51, No. 7, pp. 479-485.

Microscope investigations of morphological changes during the liquid-induced crystallization of poly(2,6-dimethyl-1,4-phenylene oxide); W. Beneoki, et al.; Acta. Polymerica 35 (1984) Nr. 3; pp. 196-200.

"Calorimetric Investigation of the Phase Behaviour of the System Poly(2,6-Dimethyl-1,4-phenyleneoxide)-antracene" L. Aerts, et al.; Bull. Soc. Chim. Belg. vol. 99; No. 11-12 (1990); pp. 931-939.

Turska et al., Polymer, vol. 19, pp. 81-84 (1978).

van Emmerik et al., European Polymer Journal, vol. 9, pp. 293-300 (1973).

Karasz et al., Journal of Polymer Science, vol. 6, Part A-2, pp. 1141-1148 (1968).

Fieser et al., "Advanced Organic Chemistry", pp. 206-211 (1963).

* cited by examiner

CONJUGATED NON-AROMATIC DIENE OR DIENOPHILIC COMPOUND-MODIFIED POLYPHENYLENE ETHERS

CROSS-REFERENCE TO RELATED APPLICATION

This is a continuation of application no. 09/869,660 filed Jun. 29, 2001 and granted Jan. 11, 2005 as U.S. Pat. No. 6,841,629.

TECHNICAL FIELD

The present invention relates to a modified polyphenylene ether resin usable as a plastic material in the electric/electronic fields, automotive field, various other industrial material fields or food/package fields; and a process for preparing said resin.

BACKGROUND ART

Since polyphenylene ethers are excellent in processability and productivity, products/parts of any shape can be produced efficiently from them by melt injection molding, melt extrusion and the like. They are therefore widely used as a material for products/parts in the electric/electronic fields, automotive field, various other industrial material fields, or food/package fields.

With recent trends in the production of a variety of products/parts particularly in the electric/electronic fields, automotive field or various other industrial fields, the demand for resin materials has increased.

In order to satisfy this demand, resin materials having properties that have not been hitherto attained in existing materials have been developed by forming a composite from different materials or by a polymer alloy technique using various existing polymer materials in combination.

Although ordinarily employed polyphenylene ethers have high heat resistance and excellent mechanical properties, materials that form composites with polyphenylene ethers are limited owing to their poor affinity for other materials. Affinity with a highly polar material such as polyamide is particularly poor so that a modified polyphenylene ether resin having polar group functionality is required upon formation of a composite with such a resin.

As means for obtaining a modified polyphenylene ether resin, chemical modification, in a molten state, of a polyphenylene ether or polyphenylene-ether-containing resin composition with a compound having a polar group is under investigation.

For example, proposed in JP-B-3-52486 (the term "JP-B" as used herein means an "examined published Japanese patent publication"), U.S. Pat. No. 4,654,405, U.S. Pat. No. 4,888,397 or JP-A-63-54425 (the term "JP-A" as used herein means an "unexamined published Japanese patent application) is a process for obtaining a modified polyphenylene ether resin by mixing a polyphenylene ether with maleic anhydride or another reactive compound for modification in the presence or absence of a radical initiator, and kneading the mixture in a molten state.

The above-described process however causes various problems, because kneading of the polyphenylene ether in a molten state requires high temperature and the melt viscosity of the polyphenylene ether is very high, which inevitably cause a marked rise in the reaction temperature.

In other words, a modified polyphenylene ether resin obtained by the conventional melt kneading method is processed at almost the decomposition temperature so that a color change due to thermal deterioration occurs and the modified polyphenylene ether resin thus obtained suffers a problem in its color tone/appearance.

In order to overcome the above-described problem in color tone/appearance, there has been proposed a process for melt extrusion of a mixture of a polyphenylene ether and an additive such as heat stabilizer and antioxidant. This process however fails in achieving sufficient improvement in color tone/appearance because the temperature upon melt kneading is unduly high.

In U.S. Pat. No. 5,159,027, there is disclosed a polyphenylene ether resin having a specific cyclic end group which resin is available by melt kneading a polyphenylene ether having a specific end structure and a compound having functionality. While the number of Fries rearrangement structures in the ordinarily employed polyphenylene ether is 0.18 or greater per 100 recurring units of the resin, the number of such structures in this polyphenylene ether resin can be reduced to 0.01 per 100 recurring monomer units of the resin. It is reported that this resin has therefore excellent color tone.

The above-described technique however cannot produce a highly functional polyphenylene ether resin having Fries rearrangement structures reduced in number to less than 0.01 per 100 recurring units.

In addition, the Fries rearrangement can be suppressed only when the polyphenylene ether has a specific cyclic end group so that the above-described technique is not sufficient for obtaining a highly functional polyphenylene ether resin.

As another technique for improving color tone/appearance, conventionally employed is addition of a plasticizer such as mineral oil to a polyphenylene ether, thereby lowering the processing temperature upon melt extrusion. The resulting modified polyphenylene ether resin, when molded or formed, has improved color tone/appearance but has deteriorated heat resistance/mechanical physical properties.

Thus, modified polyphenylene ether resins available by the prior art do not satisfy the demands of industry, because they have drawbacks in equipment/energy or are not sufficient in the balance between color tone/appearance and heat resistance/mechanical physical properties.

The present invention therefore relates to a modified polyphenylene ether resin and a process for preparing same. An object of the present invention is to provide a modified polyphenylene ether resin which exhibits sufficient functionality, is free from problems in equipment or energy, assures well-balanced color tone/appearance and heat resistance/mechanical physical properties, and can satisfy the demands of industry sufficiently.

DISCLOSURE OF THE INVENTION

With a view to attaining the above-described object, the present inventors have proceeded with an investigation and completed a modified polyphenylene ether resin which is excellent from the viewpoints of equipment and energy, has excellent color tone/appearance and moreover, has excellent heat resistance/mechanical physical properties; and a preparation process therefor.

In the present invention, there is thus provided a modified polyphenylene ether resin which is a reaction product of 100 parts by weight of (A) a polyphenylene ether having a main chain structure of the following formula (1):

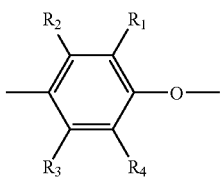

(1)

(wherein $R_1$ and $R_4$ each independently represents hydrogen, a primary or secondary lower alkyl, a phenyl, an aminoalkyl or a hydrocarbonoxy and $R_2$ and $R_3$ each independently represents hydrogen, a primary or secondary lower alkyl or a phenyl), and 0.01 to 10.0 parts by weight of (B) a modifier selected from conjugated non-aromatic diene compounds, dienophilic compounds having one dienophile group and precursors of the diene or dienophilic compounds, wherein the number of rearrangement structures represented by the following formula (2):

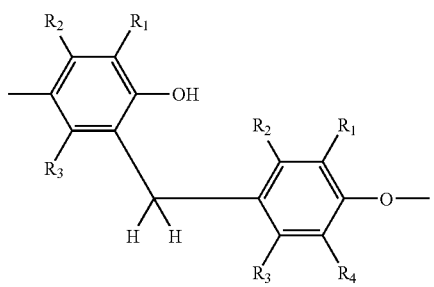

(2)

(wherein $R_1$, $R_2$, $R_3$, and $R_4$ have the same meanings as defined above in the formula (1)) is less than 0.01 per 100 phenylene ether units of the formula (1).

BEST MODE FOR CARRYING OUT THE INVENTION

The modified polyphenylene ether resin of the invention is obtained by reacting 100 parts by weight of polyphenylene ether (A) with 0.01 to 10.0 parts by weight of a modifier (B) selected from conjugated non-aromatic diene compounds, dienophilic compounds having one dienophile group and precursors of the diene or dienophilic compounds; and has functionality.

The modified polyphenylene ether resin of the invention contains, per 100 phenylene ether units of the formula (1), less than 0.01 unit of the rearrangement structure which is represented by the formula (2) (i.e., less than 10 units of the Fries rearrangement structure per 100,000 phenylene ether units and which is considered to cause coloring of the polyphenylene ether, and it is free of thermal deterioration and discoloration and is excellent in color tone/appearance.

The modified polyphenylene ether resin of the invention containing, per 100 phenylene ether units of the formula (1), less than 0.005 units of the rearrangement structure which is represented by the formula (2) and which is considered to cause coloring of the polyphenylene ether, is more preferred.

In addition, the modified polyphenylene ether resin of the invention need not contain a plasticizer so that the resin does not lose heat resistance and mechanical physical properties which the polyphenylene ether originally had.

The modified polyphenylene ether resin of the invention therefore has sufficient functionality, is excellent in color tone/appearance, in operation/energy, and in heat resistance/mechanical physical properties.

A molded or formed product available from the modified polyphenylene ether resin of the invention can be used widely as a polymer alloy because of its sufficient functionality. In addition, since the product is free from drawbacks in operation/energy and is good in color tone/appearance and heat resistance/mechanical physical properties, products or parts for use in various industrial fields which can fully satisfy the demand for them can be provided.

Polyphenylene ether (A) of the invention is a plastic material which has a main chain structure of the following formula (1):

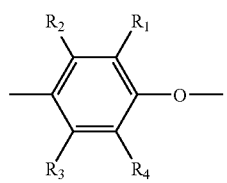

(1)

(wherein, $R_1$ and $R_4$ each independently represents hydrogen, a primary or secondary lower alkyl, a phenyl, an aminoalkyl or a hydrocarbonoxy and $R_2$ and $R_3$ each independently represents hydrogen, a primary or secondary lower alkyl or a phenyl); is suited for the formation of products/parts of any shape by melt injection molding, melt extrusion or the like forming or molding methods, and is widely used as a material for products/parts in electric/electronic fields, automotive field and various other industrial fields.

Polyphenylene ether (A) of the invention is a polymer or copolymer which has a reduced viscosity, as measured at 30° C. in chloroform solution at a concentration of 0.5 g/dl, preferably ranging from 0.15 to 1.0 dl/g, more preferably ranging from 0.20 to 0.70 dl/g.

Specific examples of polyphenylene ether (A) of the invention include poly(2,6-dimethyl-1,4-phenylene ether), poly(2-methyl-6-ethyl-1,4-phenylene ether), poly(2-methyl-6-phenyl-1,4-phenylene ether) and poly(2,6-dichloro-1,4-phenylene ether).

Further specific examples of polyphenylene ether (A) of the invention include polyphenylene ether copolymers such as copolymer of 2,6-dimethylphenol with another phenol (ex. 2,3,6-trimethylphenol or 2-methyl-6-butylphenol).

Among the above-exemplified polyphenylene ethers (A) of the invention, poly(2,6-dimethyl-1,4-phenylene ether) and a copolymer of 2,6-dimethylphenol and 2,3,6-trimethylphenol are preferred, with poly(2,6-dimethyl-1,4-phenylene ether) being most preferred.

No particular limitation is imposed on the preparation process of polyphenylene ether (A) to be used in the invention.

Examples of the process for preparing polyphenylene ether (A) to be used in the invention include that described in U.S. Pat. No. 3,306,874 wherein oxidative polymerization of 2,6-xylenol is conducted in the presence of a cuprous salt-amine complex as a catalyst.

Processes as described in U.S. Pat. Nos. 3,306,875, 3,257,357 and 3,257,358, JP-B-52-17880, and JP-A-50-51197 and 63-152628 are also preferred as a process for preparing polyphenylene ether (A).

Polyphenylene ether (A) of the invention is preferred to have an end group structure represented by the following formula (3):

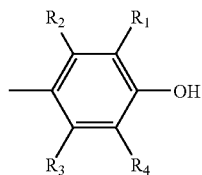

(wherein $R_1$, $R_2$, $R_3$, and $R_4$ have the same meanings as in the above-described formula (1)).

Polyphenylene ether (A) of the invention is more preferred to have an end structure represented by the following formula (4):

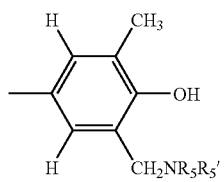

(wherein $R_5$ and $R_5'$ each represents hydrogen or an alkyl)

One example of a process for obtaining polyphenylene ether (A) having an end structure of the formula (4) is to conduct oxidative coupling of 2,6-dimethylphenol in the presence of a primary or secondary amine by using a copper- or manganese-containing catalyst.

As the primary or secondary amine, dialkylamines are preferred, with di-n-butylamine, dimethylamine and diethylamine being more preferred.

Polyphenylene ether (A) having an end structure of the formula (4) acquires high activity by passing through a quinone-methide end structure of the formula (5):

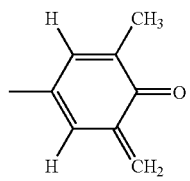

To polyphenylene ether (A) of the invention, any additive may be added according to the purpose.

Examples of the additive to be used for polyphenylene ether (A) of the invention include heat stabilizer, antioxidant, UV absorber, surfactant, lubricant, filler, polymer additive, dialkyl peroxide, diacyl peroxide, peroxy, peroxycarbonate, hydroperoxide and peroxyketal.

Modifier (B) to be used in the invention is selected from conjugated non-aromatic diene compounds, dienophilic compounds having one dienophile group and precursors for these diene or dienophilic compounds.

Alternatively, the modifier (B) can be a mixture of at least two compounds selected from conjugated non-aromatic diene compounds, dienophilic compounds having one dienophile group and precursors for these diene or dienophilic compounds.

Suitable examples of the conjugated non-aromatic diene compound to be used as modifier (B) in the invention include butadiene, cyclopentadiene and 1,3-cyclohexadiene.

The term "dienophilic compound having one dienophile group" as used herein means an unsaturated compound which can be added to a diene in a Diels-Alder reaction (for example, refer to "Advanced Organic Chemistry, pp. 206-211 (1963)", Fieser and Fieser, New York, 1963).

Suitable examples of the one-dienophile-containing dienophilic compound to be used as modifier (B) in the invention include maleimide, N-alkyl maleimides, N-aryl maleimides, acenaphthylene, indene, cinnamaldehyde, N-alkylmaleinamic acids, N-arylmaleinamic acids, maleic anhydride, maleic acid, fumaric acid, phenyl maleimide, itaconic acid, naphthoquinone, 2-methyl-1,4-naphthoquinone, glycidyl methacrylate and glycidyl acrylate.

Suitable examples of the precursor for the diene or dienophilic compounds to be used as modifier (B) in the invention include acenaphthenol, methandic anhydride and malic acid.

Compounds having at least one double bond, at least one carboxyl group, acyl oxide group, imino group, imide group, hydroxy group and glycidyl group are preferably employed as modifier (B) of the invention.

Among them, maleic anhydride, maleic acid, fumaric acid, phenyl maleimide, itaconic acid, malic acid, glycidyl acrylate or glycidyl methacrylate are especially preferred as modifier (B) of the invention.

In a process for preparing the modified polyphenylene ether resin of the invention, 100 parts by weight of polyphenylene ether (A) is mixed and reacted with 0.01 to 10.0 parts by weight of the above-described modifier (B).

When the amount of modifier (B) is less than 0.01 part by weight, the amount of the functional group becomes insufficient.

When the amount of modifier (B) exceeds 10.0 parts by weight, on the other hand, a large amount of modifier (B) remains unreacted in the modified polyphenylene ether resin, causing silver streaks upon molding or forming the resulting resin.

In the invention, mixing and reaction of 100 parts by weight of polyphenylene ether (A) with 0.1 to 5.0 parts by weight of modifier (B) are preferred.

Mixing and reaction of 100 parts by weight of polyphenylene ether (A) with 0.2 to 3.0 parts by weight of modifier (B) are more preferred.

The polyphenylene ether resin of the invention imparted with functionality can be imparted with functionality again by using a compound reactive therewith as a raw material.

The modified polyphenylene ether resin of the invention preferably contains, in 5 g of it, not greater than 100 foreign substances having a size of at least 50 μm. The term "foreign substances" as used herein means matters which are different in color (brown or dark brown) from the surroundings and insoluble in a solvent for the modified polyphenylene ether.

The number of foreign substances contained in 5 g of the modified polyphenylene ether resin and having a size of at least 50 μm can be determined by dissolving 5 g of the modified polyphenylene ether in 50 ml of chloroform, filtering the resulting solution through a filter paper and then counting the number of the foreign substances having a size of at least 50 μm and left on the filter paper by visual or microscopic observation.

In the invention, a modified polyphenylene ether containing, in 5 g thereof, not greater than 50 foreign substances is preferred.

In the invention, a modified polyphenylene ether containing, in 5 g thereof, not greater than 10 foreign substances is markedly preferred.

In the invention, a modified polyphenylene ether containing, in 5 g thereof, not greater than 5 foreign substances is most preferred.

The modified polyphenylene ether resin of the invention is preferably a reaction product of 100 parts by weight of polyphenylene ether (A) having a main chain structure of the formula (1) and at the same time, having an end structure of the following formula (4):

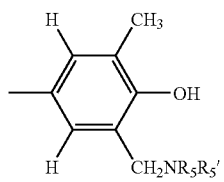

(4)

(wherein $R_5$ and $R_5'$ each represents hydrogen or an alkyl) and 0.01 to 10.0 parts by weight of modifier (B) selected from conjugated non-aromatic diene compounds, dienophilic compounds having one dienophile group and precursors of the diene or dienophilic compounds.

Polyphenylene ether (A) having the end structure of the formula (4) acquires high activity after passing through a quinone-methide type end structure of the following formula (5):

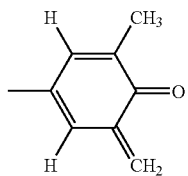

(5)

A Diels-Alder reaction occurs between this quinone-methide type end structure and modifier (B), whereby there becomes available the modified polyphenylene ether resin having a structure preferred in the invention, that is, a cyclic end structure of the following formula (6):

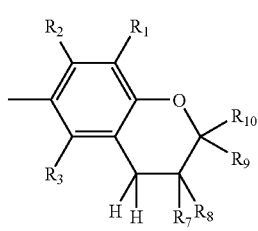

(6)

(in the formula (6), $R_1$, $R_2$ and $R_3$ have the same meanings as defined in the formula (1), and $R_7$, $R_8$, $R_9$ and $R_{10}$ are each determined by the results of the Diels-Alder reaction of polyphenylene ether (A) having a structure of the formula (5) and modifier (B) and differs with the kind of modifier (B), or $R_7$, $R_8$, $R_9$ and $R_{10}$ may each represent a spirocyclic structure independently bonded thereto).

The reaction of polyphenylene ether (A) with modifier (B) happens to prepare a modified polyphenylene ether resin of formula (8) below, which is considered to result from the reaction of modifier (B) and a radical intermediate structure of the following formula (7):

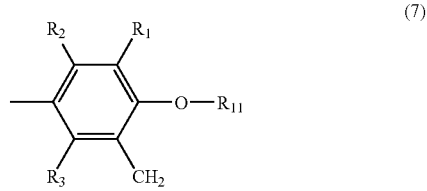

(7)

(in the formula (7), $R_1$, $R_2$, and $R_3$ have the same meanings as defined in the formula (1) and $R_{11}$ represents hydrogen or a polymer having a phenylene ether unit)

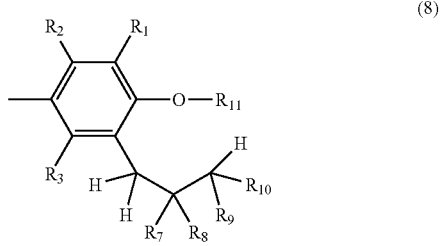

(8)

(in the formula (8), $R_1$, $R_2$, $R_3$ and $R_{11}$ have the same meanings as defined in the formula (7), or $R_7$, $R_8$, $R_9$ and $R_{10}$ in the formula (8) are each determined by the results of radical reaction of polyphenylene ether (A) having a structure of the formula (7) and modifier (B) and differs with the kind of modifier (B), or $R_7$, $R_8$, $R_9$ and $R_{10}$ may each represent a spirocyclic structure independently bonded thereto).

The modified structure of formula (8) has high functionality but effects for improving color tone and the number of foreign substances upon secondary processing of the modified polyphenylene ether resin are not superior to those of the cyclic end structure of the formula (6).

In the present invention, preferably employed is the modified polyphenylene ether resin containing, per 100 phenylene ether units of the following formula (1):

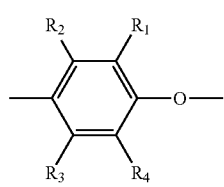

(1)

(wherein $R_1$ and $R_4$ each independently represents hydrogen, a primary or secondary lower alkyl, a phenyl, an aminoalkyl or a hydrocarbonoxy and $R_2$ and $R_3$ each independently represents hydrogen, a primary or secondary lower alkyl or a phenyl), Nc pieces, on average, of the cyclic modified structure of the following formula (6):

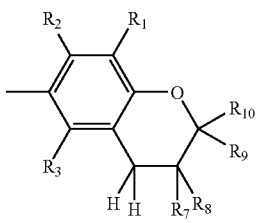

(6)

(in the formula (6), $R_1$, $R_2$ and $R_3$ have the same meanings as defined in the formula (1), and $R_7$, $R_8$, $R_9$ and $R_{10}$ are each determined by the results of the Diels-Alder reaction of polyphenylene ether (A) having a structure of the above-described formula (5) and modifier (B) and differs with the kind of modifier (B), or $R_7$, $R_8$, $R_9$ and $R_{10}$ may each represent a spirocyclic structure independently bonded thereto) and No pieces, on average, of the noncyclic modified structure of the following formula (8):

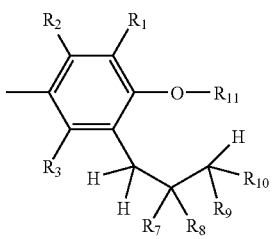

(8)

(in the formula (8), $R_1$, $R_2$, $R_3$ and $R_{11}$ have the same meanings as defined in the formula (7), or $R_7$, $R_8$, $R_9$ and $R_{10}$ in the formula (8) are each determined by the results of radical reaction of polyphenylene ether (A) having a structure of the above-described formula (7) and modifier (B) and differs with the kind of modifier (B), or $R_7$, $R_8$, $R_9$ and $R_{10}$ may each represent a spirocyclic structure independently bonded thereto) at an $N_c/N_o$ ratio of 1 or greater, because it is particularly superior in color tone and contains foreign substances in a markedly small amount.

In the invention, the modified polyphenylene ether resin having the $N_c/N_o$ ratio of 2 or greater is more preferably employed.

In the invention, the modified polyphenylene ether resin having the $N_c/N_o$ ratio of 3 or greater is especially preferably employed.

In the invention, the modified polyphenylene ether resin having a melting point of 150 to 260° C. and being in the form of powder having an average particle size of 3.0 μm to 1.0 mm is preferably employed.

In the preparation process of the modified polyphenylene ether resin of the invention, the reaction temperature is not lower than a room temperature and not higher than the melting point of polyphenylene ether (A).

The term "room temperature" as used herein means 27° C.

In the invention, when the reaction temperature is less than the room temperature, polyphenylene ether (A) cannot react with modifier (B) sufficiently.

In the invention, crystalline polyphenylene ether having a melting point is preferably employed as a raw material for polyphenylene ether (A).

Examples of the literature describing the relation between crystalline polyphenylene ether and its melting point include "Journal of Polymer Science, Part A-2(6), 1141-1148 (1968)", "European Polymer Journal (9), 293-300 (1973)" and "Polymer, (19), 81-84 (1978)".

In the invention, the melting point of polyphenylene ether (A) is defined as a peak top temperature of the peak observed in a temperature-heat flow rate graph available by increasing the temperature of (A) at 20° C./min in measurement by differential scanning calorimeter (DSC).

In the invention, when there exist plural peak top temperatures, the melting point of polyphenylene ether (A) is defined by the highest temperature among them.

In the preparation process of the modified polyphenylene ether resin in the invention, preferred is polyphenylene ether (A) in the powdery form available by precipitation from a solution and having a melting point of 150 to 260° C.

The polyphenylene ether sometimes contains therein a trace of a good solvent to be used in its polymerization step.

Examples of the good solvent for the polyphenylene ether include toluene, o-xylene, m-xylene, p-xylene, ethylbenzene and chloroform. Although in the present invention, reaction of the polyphenylene ether is effected in the solid form and positive addition of a good solvent is not required, the good solvent, which was used in the polymerization step, does not do any harm even if it is contained in the polymer in a trace. This case can be regarded as substantially solventless.

This "substantially solventless" state means that polyphenylene ether (A) remains as a substantially solid and the melting point of polyphenylene ether (A) appears clearly.

In the invention, polyphenylene ether (A) in the substantially solventless state preferably has a melting point of 150 to 260° C., more preferably 200 to 260° C., especially 240 to 260° C.

Reaction under the substantially solventless state is especially preferred, because it does not need separating operation of a solvent, which makes this invention excellent from the viewpoints of operation/energy.

The above-described polyphenylene ether in powder form preferably has a heat of fusion (ΔH), available from the peak at DSC measurement, of 2 J/g or greater.

In the invention, at the reaction temperature exceeding the melting point of polyphenylene ether (A), polyphenylene ether (A) is melted and sticks to the reactor employed.

At this time, when reaction of polyphenylene ether (A) and modifier (B) is promoted by intensive kneading, polyphenylene ether (A) has deteriorated color tone/appearance owing to the heat generated upon kneading.

In the invention, reaction temperature ranging from 100 to 230° C. is preferred, with a range of 150 to 200° C. being especially preferred.

In the invention, the pressure upon reaction of polyphenylene ether (A) and modifier (B) preferably ranges from 0 to 2 MPa, with a range of 0 to 1 MPa being especially preferred.

In the preparation process of the modified polyphenylene ether resin of the invention, use of a paddle drier as a reactor is preferred.

The modified polyphenylene ether resin of the invention can be prepared efficiently by using a paddle drier having a jacket set at a desired temperature.

In the preparation process of the modified polyphenylene ether resin of the invention, use of a Henschel mixer as a reactor is more preferred.

Use of a Henschel mixer as a reactor makes it possible to efficiently mix polyphenylene ether (A) and modifier (B) and heat the mixture by shearing heat, thereby preparing the modified polyphenylene ether resin of the invention efficiently.

As a preparation process of the modified polyphenylene ether resin of the invention, it is especially preferred to mix polyphenylene ether (A) and modifier (B) in advance by a paddle drier having a jacket set at a desired temperature and/or a Henschel mixer, heat the mixture and then continue reaction in a hopper.

There is, however, no particular limitation imposed on the preparation process of the modified polyphenylene ether resin of the invention.

The modified polyphenylene ether resin of the invention can be prepared by adding a reaction assistant.

Preferred examples of the reaction assistant used for the preparation of the modified polyphenylene ether resin of the invention include radical initiators, bases, inorganic acids, organic acids, inorganic acid salts and organic acid salts.

The modified polyphenylene ether resin of the invention is excellent in color tone/appearance.

The modified polyphenylene ether resin of the invention has excellent mechanical physical properties so that it can be used as is.

The modified polyphenylene ether resin of the invention is preferably used in the form of a polymer alloy or polymer composite obtained by mixing with another composition and then kneading in a molten state.

The modified polyphenylene ether resin of the invention is more preferably used in the form of a polymer alloy or polymer composite obtained by mixing the resin with another composition and a solvent and dissolving the former two in the latter.

The modified polyphenylene ether resin of the invention is especially preferred in the form of a polymer alloy kneaded with a polyamide, polyimide, polyether imide, polyester or polycarbonate.

No particular limitation is imposed on the use of the modified polyphenylene ether resin of the invention and it can be used widely for electric/electronic fields, automotive fields, various other industrial material fields and food/package fields.

The polymer alloy or polymer composite containing the modified polyphenylene ether resin of the invention can be preferably used in electric/electronic fields, automotive fields, various other industrial material fields, and food/package fields.

The polymer alloy obtained by kneading, in a molten state, the modified polyphenylene ether resin of the invention with a polyamide, polyimide or polyester can be very advantageously used in electric/electronic fields, automotive fields, various other industrial material fields, and food/package fields, because of excellence in color tone/appearance, mechanical properties and productivity.

The modes for carrying out the invention will be illustrated in greater detail with reference to the following Examples, but the invention should not be construed as being limited thereto.

In Examples and Comparative Examples, the following polyphenylene ethers (A) were employed.

A-1: poly(2,6-dimethyl-1,4-phenylene ether) having a reduced viscosity of 0.54, which was obtained by oxidative polymerization of 2,6-dimethylphenol.

A-2: poly(2,6-dimethyl-1,4-phenylene ether) having a reduced viscosity of 0.31, which was obtained by oxidative polymerization of 2,6-dimethylphenol.

In Examples and Comparative Examples, the following modifiers (B) were employed.

B-1: maleic anhydride
B-2: fumaric acid
B-3: phenyl maleimide
B-4: maleic acid
B-5: glycidyl methacrylate In Examples and Comparative Examples, the melting point was evaluated in the following manner.

The peak top temperature in the temperature-heat flow rate graph available by heating polyphenylene ether (A) at 20° C./min using a differential scanning calorimeter (DSC) was designated as its melting point.

The temperature-heat flow rate graph of polyphenylene ether (A-1) exhibited a single peak. The melting point was 250° C., while the heat of melting ΔH was 20 J/g.

The temperature-heat flow rate graph of polyphenylene ether (A-2) exhibited a single peak. The melting point was 245° C., while the heat of melting ΔH was 22 J/g.

The average particle sizes of polyphenylene ethers (A-1) and (A-2) were measured, resulting in 50 µm and 25 µm, respectively.

EXAMPLE 1

To an autoclave equipped with a gas inlet were charged 100 g of polyphenylene ether (A-1), 2 g of modifier (B-1) and 5 iron balls for stirring having a diameter of 5 mm.

After the pressure inside of the autoclave was reduced to 10 mmHg through the gas inlet at room temperature, nitrogen at atmospheric pressure was introduced to purge the inside with nitrogen.

The above-described operation was repeated three times. The autoclave was then hermetically sealed.

Upon pressure reduction and nitrogen purging, (A-1) and (B-1) released outside of the system were collected.

The amounts of (A-1) and (B-1) released outside were 0.1 g and 0.02 g, respectively.

The hermetically sealed autoclave was placed in an oil bath set at 200° C., followed by vigorous shaking for 15 minutes.

The autoclave was then taken out of the oil bath and allowed to stand at room temperature for 1 hour.

The autoclave was opened and Contents (C-1-1) in powder form were harvested.

It was found that no molten substance was mixed in Contents (C-1-1).

The mass of Contents (C-1-1) was 101.7 g.

A 50 g portion of Contents (C-1-1) was washed with 100 ml of acetone, followed by filtration through a glass filter.

This operation was repeated 5 times, whereby Wash 1 (D-1-1) and Filtrate 1 (E-1-1) were obtained.

Analysis of the gas chromatogram revealed that 0.3 g of modifier (B) was contained in Filtrate 1 (E-1-1).

A 20 g portion of Dried substance 1 (F-1-1) obtained by drying Wash 1 (D-1-1) was washed with 40 ml of acetone, followed by filtration through a glass filter.

This operation was repeated 5 times, whereby Wash 2 (H-1-1) and Filtrate 2 (G-1-1) were obtained.

Analysis of the gas chromatogram revealed that Filtrate 2 (G-1-1) was free of modifier (B-1).

Dried substance 1 (F-1-1) was sandwiched between sheets each successively composed of a polytetrafluoroethylene sheet, an aluminum sheet and an iron sheet, with the polytetrafluoroethylene sheet being disposed on the side of Dried substance 1. The laminate thus formed was compression molded at 10 MPa by using a pressing machine set at 280° C., whereby Film (I-1-1) was obtained.

By a similar operation, Film (A-1-1) was obtained from polyphenylene ether (A-1).

The resulting Films (I-1-1) and (A-1-1) were each subjected to infrared spectroscopic measurement using a Fourier transform infrared spectrometer ("IR-420 Type", trade name; manufactured by JASCO Corporation).

As a result of measurement of (I-1-1), a peak derived from maleic acid added to the polyphenylene ether was observed at 1790 $cm^{-1}$.

As a result of measurement of (A-1-1), on the other hand, no peak was observed at 1790 $cm^{-1}$.

In addition, $^1$H-NMR measurement was conducted on each of the solutions of Dried product 1 (F-1-1), Film (I-1-1) and Film (A-1-1) in deuterated chloroform by using a Fourier transform NMR analyzer "Lambda 400" (trade name; manufactured by Nippon Denshisha).

From Dried product 1 (F-1-1), no peak was recognized at 6.92 ppm derived from $^1$H at the 3,5-position of the benzene ring of the following formula (9).

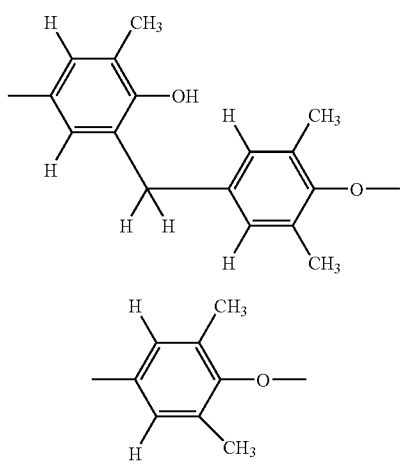

From Film (I-1-1), a peak at 6.92 ppm derived from $^1$H at the 3,5-position of the benzene ring derived from the rearrangement structure represented by the formula (9) was recognized. Based on the comparison in area between this peak and the peak at 6.43 ppm derived from $^1$H at the 3,5-position of the main-chain benzene ring represented by the formula (10), the number of the rearrangement structure of the formula (9) was analyzed to be 0.004 per 100 main chain structures of the formula (10).

With regards to (A-1-1), a large peak at 6.92 ppm derived from $^1$H at the 3,5-position of the benzene ring derived from the rearrangement structure represented by the formula (9) was confirmed, resulting in analysis that the number of the rearrangement structure of the formula (9) was 0.11 per 100 main chain structures of the formula (10).

NMR measurement results indicate that a ratio $N_c/N_o$ of the number (Nc) of the structure of the following formula (11):

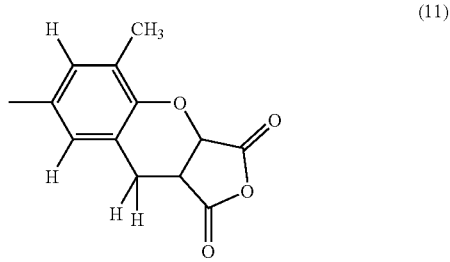

to the number (No) of the structure of the following formula (12):

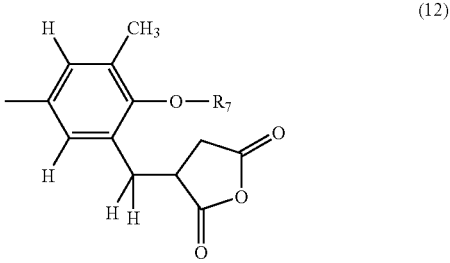

was 2.5.

By using a pressing machine set at a mold temperature of 280° C., 20 g of Dried product 1 (F-1-1) was press molded, whereby Flat-plate molding (J-1-1) of 50×80×3 mm in size was obtained.

The resulting flat-plate molding was transparent and pale yellow and no foreign substances were observed from it.

EXAMPLE 2

100 g of polyphenylene ether (A-2) and 2 g of modifier (B-2) were charged to an autoclave, followed by purging with nitrogen and hermetical sealing in a similar manner to Example 1.

The amounts of (A-2) and (B-2) released out of the system upon pressure reduction and nitrogen purging were 0.06 g and 0.02 g, respectively.

In a similar manner to Example 1, the hermetically sealed autoclave was placed in an oil bath set at 200° C., followed by vigorous shaking for 5 minutes, whereby 101.6 g of Contents (C-2-1) were obtained in powdery form.

From a 50 g portion of Contents (C-2-1), Wash 1 (D-2-1), Filtrate 1 (E-2-1), 49.4 g of Dried substance 1 (F-2-1) and Filtrate 2 (G-2-1) were obtained in a similar manner to Example 1.

The amounts of modifier (B-2) contained in Filtrate 1 (E-2-1) and Filtrate 2 (G-2-1) were 0.3 g and 0 g, respectively.

In a similar manner to Example 1, Film (I-2-1) was obtained from Dried substance 1 (F-2-1).

By infrared spectroscopic measurement of (I-2-1), a peak derived from fumaric acid added to the polyphenylene ether was observed at 1788 $cm^{-1}$.

In a similar manner to Example 1, Flat-plate molding (J-2-1) was obtained.

The resulting flat-plate molding was, like that obtained in Example 1, transparent and pale yellow and no foreign substances were observed from it.

In a similar manner to Example 1, $^1$H-NMR measurement of Dried Substance 1 (F-2-1) and Film (I-2-1) was conducted.

Analysis based on the comparison in area between the peak at 6.92 ppm and the peak at 6.43 ppm revealed that the number of the rearrangement structures of the formula (9) per 100 main chain structures of the formula (10) was 0 in Dried Product (F-2-1) and 0.003 in Film (I-2-1).

EXAMPLE 3

100 g of polyphenylene ether (A-1) and 2 g of modifier (B-1) were charged to an autoclave, followed by purging with nitrogen and hermetical sealing in a similar manner to Example 1.

The amounts of (A-1) and (B-1) released out of the system upon pressure reduction and nitrogen purging were 0.08 grand 0.03 g, respectively.

The hermetically sealed autoclave was placed in an oil bath set at 150° C., followed by shaking for 5 minutes, whereby 101.0 g of Contents (C-3-1) were obtained in the powdery form.

From a 50 g portion of Contents (C-3-1), Wash 1 (D-3-1), Filtrate 1 (E-3-1), 49.0 g of Dried substance 1 (F-3-1) and Filtrate 2 (G-3-1) were obtained in a similar manner to Example 1.

The amounts of modifier (B-1) contained in Filtrate 1 (E-3-1) and Filtrate 2 (G-3-1) were 0.4 g and 0 g, respectively.

In a similar manner to Example 1, Film (I-3-1) was obtained from Dried substance 1 (F-3-1).

By infrared spectroscopic measurement of (I-3-1), a peak derived from maleic anhydride added to the polyphenylene ether was observed at 1790 cm$^{-1}$.

In a similar manner to Example 1, Flat-plate molding (J-3-1) which was transparent and pale yellow and from which no foreign substances were observed was obtained.

$^1$H-NMR measurement and analysis in a similar manner to Example 1 revealed that the number of the rearrangement structures of the formula (9) per 100 main chain structures of the formula (10) was 0 in Dried Product (F-3-1) and 0.004 in Film (I-3-1).

EXAMPLE 4

100 g of polyphenylene ether (A-1) and 2 g of modifier (B-1) were charged to an autoclave, followed by purging with nitrogen and hermetical sealing in a similar manner to Example 1.

The amounts of (A-1) and (B-1) released out of the system upon pressure reduction and nitrogen purging were 0.1 g and 0.03 g, respectively.

The hermetically sealed autoclave was placed in an oil bath set at 130° C., followed by shaking for 5 minutes, whereby 101.2 g of Contents (C-4-1) were obtained in powder form.

From a 50 g portion of Contents (C-4-1), Wash 1 (D-4-1), Filtrate 1 (E-4-1), 49.0 g of Dried substance 1 (F-4-1) and Filtrate 2 (G-4-1) were obtained in a similar manner to Example 1.

The amounts of modifier (B-1) contained in Filtrate 1 (E-4-1) and Filtrate 2 (G-4-1) were 0.3 g and 0 g, respectively.

In a similar manner to Example 1, Film (I-4-1) was obtained from Dried substance 1 (F-4-1).

By infrared spectroscopic analysis of (I-4-1), a peak derived from maleic anhydride added to the polyphenylene ether was observed at 1789 cm$^{-1}$.

In a similar manner to Example 1, Flat-plate molding (J-4-1) which was transparent and pale yellow and from which no foreign substances were observed was obtained.

$^1$H-NMR measurement and analysis in a similar manner to Example 1 revealed that the number of the rearrangement structures of the formula (9) per 100 main chain structures of the formula (10) was 0 in Dried Product (F-4-1) and 0.003 in Film (I-4-1).

EXAMPLE 5

100 g of polyphenylene ether (A-1) and 2 g of modifier (B-1) were charged to an autoclave, followed by purging with nitrogen and hermetical sealing in a similar manner to Example 1.

The amounts of (A-1) and (B-1) released out of the system upon pressure reduction and nitrogen purging were 0.1 g and 0.05 g, respectively.

The hermetically sealed autoclave was placed in an oil bath set at 215° C., followed by shaking for 5 minutes, whereby 100.0 g of Contents (C-5-1) were obtained in the powdery form.

From a 50 g portion of Contents (C-5-1), Wash 1 (D-5-1), Filtrate 1 (E-5-1), 49.3 g of Dried substance 1 (F-5-1) and Filtrate 2 (G-5-1) were obtained in a similar manner to Example 1.

The amounts of modifier (B-1) contained in Filtrate 1 (E-5-1) and Filtrate 2 (G-5-1) were 0.3 g and 0 g, respectively.

In a similar manner to Example 1, Film (I-5-1) was obtained from Dried substance 1 (F-5-1).

By infrared spectroscopic measurement of (I-5-1), a peak derived from maleic anhydride added to the polyphenylene ether was observed at 1790 cm$^{-1}$.

In a similar manner to Example 1, Flat-plate molding (J-5-1) which was transparent and pale yellow and from which no foreign substances were observed was obtained.

$^1$H-NMR measurement and analysis in a similar manner to Example 1 revealed that the number of the rearrangement structures of the formula (9) per 100 main chain structures of the formula (10) was 0.001 in Dried Product (F-5-1) and 0.006 in Film (I-5-1).

EXAMPLE 6

100 g of polyphenylene ether (A-1) and 2 g of modifier (B-1) were charged to an autoclave, followed by purging with nitrogen and hermetical sealing in a similar manner to Example 1.

The amounts of (A-1) and (B-1) released out of the system upon pressure reduction and nitrogen purging were 0.17 g and 0.05 g, respectively.

The hermetically sealed autoclave was placed in an oil bath set at 225° C., followed by shaking for 5 minutes, whereby 99.0 g of Contents (C-6-1) were obtained in the form of slightly agglomerated powder.

From a 50 g portion of Contents (C-6-1), Wash 1 (D-6-1), Filtrate 1 (E-6-1), 49.5 g of Dried substance 1 (F-6-1) and Filtrate 2 (G-6-1) were obtained in a similar manner to Example 1.

The amounts of modifier (B-1) contained in Filtrate 1 (E-6-1) and Filtrate 2 (G-6-1) were 0.1 g and 0 g, respectively.

In a similar manner to Example 1, Film (I-6-1) was obtained from Dried substance 1 (F-6-1).

By infrared spectroscopic measurement of (I-6-1), a peak derived from maleic anhydride added to the polyphenylene ether was observed at 1790 cm$^{-1}$.

In a similar manner to Example 1, Flat-plate molding (J-6-1) which was transparent and pale yellow and from which no foreign substances were observed was obtained.

$^1$H-NMR measurement and analysis in a similar manner to Example 1 revealed that the number of the rearrangement structures of the formula (9) per 100 main chain structures of the formula (10) was 0.004 in Dried Product (F-6-1) and 0.008 in Film (I-6-1).

COMPARATIVE EXAMPLE 1

100 g of polyphenylene ether (A-1) and 2 g of modifier (B-1) were charged to an autoclave, followed by purging with nitrogen and hermetical sealing in a similar manner to Example 1.

The amounts of (A-1) and (B-1) released out of the system upon pressure reduction and nitrogen purging were 0.1 g and 0.05 g, respectively.

The hermetically sealed autoclave was placed in an oil bath set at 260° C., followed by shaking for 5 minutes, whereby Contents (C-7-1) were obtained.

It was difficult to take out Contents (C-7-1) from the autoclave because it stuck to the inside thereof.

From a 50 g portion of Contents (C-7-1), Wash 1 (D-7-1), Filtrate 1 (E-7-1), 49.6 g of Dried substance 1 (F-7-1) and Filtrate 2 (G-7-1) were obtained in a similar manner to Example 1.

The amounts of modifier (B-1) contained in Filtrate 1 (E-7-1) and Filtrate 2 (G-7-1) were 0.2 g and 0 g, respectively.

In a similar manner to Example 1, Film (I-7-1) was obtained.

By infrared spectroscopic measurement of (I-7-1), a peak derived from maleic anhydride added to the polyphenylene ether was observed at 1790 cm$^{-1}$.

Flat-plate molding (O-7-1) which was transparent and dark yellow and from which no foreign substances were observed was obtained.

$^1$H-NMR measurement and analysis in a similar manner to Example 1 revealed that the number of the rearrangement structures of the formula (9) per 100 main chain structures of the formula (10) was 0.012 in Dried Product (F-7-1) and 0.02 in Film (I-7-1).

COMPARATIVE EXAMPLE 2

In a Henschel mixer, 5 kg of polyphenylene ether (A-1) and 100 g of modifier (B-1) were mixed. An attempt was made on extrusion kneading of the resulting mixture using an extruder ("ZSK-25 Type", trade name; manufactured by Werner & Pfleiderer) having a barrel temperature set at 340° C.

From the pellets thus obtained, a film was prepared in a similar manner to Example 1. As a result of infrared spectroscopic measurement of the film, a peak derived from maleic anhydride added to the polyphenylene ether was observed at 1790 cm$^{-1}$.

Flat-plate molding obtained in a similar manner to Example 1 was found to be dark brown and contain black foreign substances.

$^1$H-NMR measurement and analysis in a similar manner to Example 1 revealed that the number of the rearrangement structures of the formula (9) per 100 main chain structures of the formula (10) was 0.03 in the pellets and 0.05 in the flat-plate molding.

EXAMPLE 7

100 g of polyphenylene ether (A-1) and 0.3 g of modifier (B-1) were charged in an autoclave, followed by purging with nitrogen and hermetical sealing in a similar manner to Example 1.

The amounts of (A-1) and (B-1) released out of the system upon pressure reduction and nitrogen purging were 0.1 g and 0.01 g, respectively.

The hermetically sealed autoclave was placed in an oil bath set at 200° C., followed by shaking for 5 minutes, whereby 100.1 g of Contents (C-8-1) were obtained in the powdery form.

From a 50 g portion of Contents (C-8-1), Wash 1 (D-8-1), Filtrate 1 (E-8-1), 49.8 g of Dried substance 1 (F-8-1) and Filtrate 2 (G-8-1) were obtained in a similar manner to Example 1.

The amounts of modifier (B-1) contained in Filtrate 1 (E-8-1) and Filtrate 2 (G-8-1) were 0.05 g and 0 g, respectively.

In a similar manner to Example 1, Film (I-8-1) was obtained.

By infrared spectroscopic measurement of (I-8-1), a peak derived from maleic anhydride added to the polyphenylene ether was observed at 1790 cm$^{-1}$.

In a similar manner to Example 1, Flat-plate molding (J-8-1) which was transparent and pale yellow and from which no foreign substances were observed was obtained.

$^1$H-NMR measurement and analysis in a similar manner to Example 1 revealed that the number of the rearrangement structures of the formula (9) per 100 main chain structures of the formula (10) was 0 in Dried Product (F-8-1) and 0.003 in Film (I-8-1).

COMPARATIVE EXAMPLE 3

100 g of polyphenylene ether (A-1) and 0.05 g of modifier (B-1) were charged to an autoclave, followed by purging with nitrogen and hermetical sealing in a similar manner to Example 1.

The amounts of (A-1) and (B-1) released out of the system upon pressure reduction and nitrogen purging were 0.2 g and 0.01 g, respectively.

The hermetically sealed autoclave was placed in an oil bath set at 200° C., followed by shaking for 5 minutes, whereby 100 g of Contents (C-9-1) were obtained in the powdery form.

From a 50 g portion of Contents (C-9-1), Wash 1 (D-9-1), Filtrate 1 (E-9-1), 49.7 g of Dried substance 1 (F-9-1) and Filtrate 2 (G-9-1) were obtained in a similar manner to Example 1.

The amounts of modifier (B-1) contained in Filtrate 1 (E-9-1) and Filtrate 2 (G-9-1) were 0.006 g and 0 g, respectively.

In a similar manner to Example 1, Film (I-9-1) was obtained.

By infrared spectroscopic measurement of (I-9-1), a peak at 1790 cm$^{-1}$ derived from maleic anhydride was not observed clearly.

EXAMPLE 8

100 g of polyphenylene ether (A-1) and 9 g of modifier (B-1) were charged to an autoclave, followed by purging with nitrogen and hermetical sealing in a similar manner to Example 1.

The amounts of (A-1) and (B-1) released out of the system upon pressure reduction and nitrogen purging were 0.2 g and 0.8 g, respectively.

The hermetically sealed autoclave was placed in an oil bath set at 200° C., followed by shaking for 5 minutes, whereby 106.5 g of Contents (C-10-1) were obtained in the powder form.

From a 50 g portion of Contents (C-10-1), Wash 1 (D-10-1), Filtrate 1 (E-10-1), 45.7 g of Dried substance 1 (F-10-1) and Filtrate 2 (G-10-1) were obtained in a similar manner to Example 1.

The amounts of modifier (B-1) contained in Filtrate 1 (E-10-1) and Filtrate 2 (G-10-1) were 4.0 g and 0 g, respectively.

In a similar manner to Example 1, Film (I-10-1) was obtained.

By infrared spectroscopic measurement of (I-10-1), a peak derived from maleic anhydride added to the polyphenylene ether was observed at 1790 cm$^{-1}$.

In a similar manner to Example 1, Flat-plate molding (J-10-1) which was transparent and pale yellow and from which no foreign substances were observed was obtained.

$^1$H-NMR measurement and analysis in a similar manner to Example 1 revealed that the number of the rearrangement structures of the formula (9) per 100 main chain structures of the formula (10) was 0 in Dried Product (F-10-1) and 0.004 in Film (I-10-1).

COMPARATIVE EXAMPLE 4

100 g of polyphenylene ether (A-1) and 12 g of modifier (B-1) were charged to an autoclave, followed by purging with nitrogen and hermetical sealing in a similar manner to Example 1. The amounts of (A-1) and (B-1) released out of the system upon pressure reduction and nitrogen purging were 0.5 g and 2.8 g, respectively.

The hermetically sealed autoclave was placed in an oil bath set at 200° C., followed by shaking for 5 minutes, whereby 100.5 g of Contents (C-11-1) were obtained in the mass form. It was difficult to take it out from the autoclave because it was in the mass form.

From a 50 g portion of Contents (C-11-1), Wash 1 (D-11-1), Filtrate 1 (E-11-1), 43.7 g of Dried substance 1 (F-11-1) and Filtrate 2 (G-11-1) were obtained in a similar manner to Example 1.

The amounts of modifier (B-1) contained in Filtrate 1 (E-11-1) and Filtrate 2 (G-11-1) were 5.3 g and 0 g, respectively.

In a similar manner to Example 1, Film (I-11-1) was obtained.

By infrared spectroscopic measurement of (I-11-1), a peak at 1790 cm$^{-1}$ derived from maleic anhydride was observed.

In a similar manner to Example 1, Flat-plate molding (J-11-1) which was transparent and pale yellow and from which no foreign substances were observed was obtained.

EXAMPLE 9

To a paddle drier manufactured by Nara Machinery Co., Ltd. were charged 10 kg of polyphenylene ether (A-1) and 200 g of modifier (B-1), followed by nitrogen purging while stirring inside of the drier.

After nitrogen purging, the paddle drier was hermetically sealed. While internally stirring, the jacket temperature was increased from room temperature to 180° C. over 1 hour.

After keeping the temperature at 180° C. for 1 hour, the jacket temperature was lowered to room temperature over 1 hour.

As a result, 9.85 kg of Contents (C-12-1) were obtained in powdery form.

From a 50 g portion of Contents (C-12-1), Wash 1 (D-12-1), Filtrate 1 (E-12-1), 49.2 g of Dried substance 1 (F-12-1) and Filtrate 2 (G-12-1) were obtained in a similar manner to Example 1.

The amounts of modifier (B-1) contained in Filtrate 1 (E-12-1) and Filtrate 2 (G-12-1) were 0.2 g and 0 g, respectively.

In a similar manner to Example 1, Film (I-12-1) was obtained.

By infrared spectroscopic measurement of (I-12-1), a peak derived from maleic anhydride added to the polyphenylene ether was observed at 1790 cm$^{-1}$. In a similar manner to Example 1, Flat-plate molding (J-12-1) which was transparent and pale yellow and from which no foreign substances were observed was obtained.

$^1$H-NMR measurement and analysis in a similar manner to Example 1 revealed that the number of the rearrangement structures of the formula (9) per 100 main chain structures of the formula (10) was 0.001 in Dried Product (F-12-1) and 0.004 in Film (I-12-1).

In a Henschel mixer, a 1 kg portion of Contents (C-12-1), 1 kg of (A-1), 1.6 kg of a polyamide 6,6 resin ("Leona Resin 1300S", trade name; product of Asahi Kasei Corporation) and 0.4 kg of a hydrogenated SB block copolymer ("Tuftec H1077", trade name; product of Asahi Kasei Corporation) were mixed, followed by extrusion kneading by using an extruder ("Model ZSK-25", trade name; manufactured by Werner & Pfleiderer) having a barrel temperature set at 340° C., whereby Pellets (P-12-1) were obtained.

Pellets (P-12-1) were injection molded by an injection molder into an ASTM standard test piece. Its tensile strength (ASTM D-638, 23° C.), tensile elongation at break (ASTM D-638, 23° C.) and Izod (notched) impact strength (ASTM D-256, 23° C.) were measured in accordance with the ASTM standards.

Measurement revealed that the tensile strength was 61 MPa, tensile elongation at break was 100% or greater and Izod (notched) impact strength was 500 J/m.

COMPARATIVE EXAMPLE 5

In a similar manner to Example 9, 2 kg of (A-1), 1.6 kg of a polyamide 6,6 resin ("Leona Resin 1300S", trade name; product of Asahi Kasei Corporation) and 0.4 kg of a hydrogenated SB block copolymer ("Tuftec H1077", trade name; product of Asahi Kasei Corporation) were mixed in a Henschel mixer, followed by extrusion kneading by using an extruder ("Model ZSK-25", trade name; manufactured by Werner & Pfleiderer) having a barrel temperature set at 340° C., whereby Pellets (P-13-1) were obtained.

Pellets (P-13-1) were injection molded by an injection molder into an ASTM standard test piece. Its tensile strength (ASTM D-638, 23° C.), tensile elongation at break (ASTM D-638, 23° C.) and Izod (notched) impact strength (ASTM D-256, 23° C.) were measured in accordance with the ASTM standards.

Measurement revealed that the tensile strength was 57 MPa, tensile elongation at break was 5% and Izod (notched) impact strength was 27 J/m.

EXAMPLE 10

100 g of polyphenylene ether (A-1) and 2 g of modifier (B-3) were charged to an autoclave, followed by purging with nitrogen and hermetical sealing in a similar manner to Example 1.

The amounts of (A-1) and (B-3) released out of the system upon pressure reduction and nitrogen purging were 0.2 g and 0.8 g, respectively.

The hermetically sealed autoclave was placed in an oil bath set at 200° C., followed by shaking for 5 minutes, whereby 100.5 g of Contents (C-14-1) were obtained in powdery form.

From a 50 g portion of Contents (C-14-1), Wash 1 (D-14-1), Filtrate 1 (E-14-1), 48.9 g of Dried substance 1 (F-14-1) and Filtrate 2 (G-14-1) were obtained in a similar manner to Example 1.

The amounts of modifier (B-3) contained in Filtrate 1 (E-14-1) and Filtrate 2 (G-14-1) were 0.5 g and 0 g, respectively.

In a similar manner to Example 1, Flat-plate molding (J-14-1) which was transparent and pale yellow and from which no foreign substances were observed was obtained.

$^1$H-NMR measurement and analysis in a similar manner to Example 1 revealed that the number of the rearrangement structures of the formula (9) per 100 main chain structures of the formula (10) was 0 in Dried Product (F-14-1) and 0.002 in Film (I-14-1).

EXAMPLE 11

100 g of polyphenylene ether (A-1) and 2 g of modifier (B-4) were charged to an autoclave, followed by nitrogen purging and hermetical sealing in a similar manner to Example 1.

The amounts of (A-1) and (B-4) released out of the system upon pressure reduction and nitrogen purging were 0.2 g and 0.6 g, respectively.

The hermetically sealed autoclave was placed in an oil bath set at 200° C., followed by shaking for 5 minutes, whereby 100.2 g of Contents (C-15-1) were obtained in the powdery form.

From a 50 g portion of Contents (C-15-1), Wash 1 (D-15-1), Filtrate 1 (E-15-1), 49.2 g of Dried substance 1 (F-15-1) and Filtrate 2 (G-15-1) were obtained in a similar manner to Example 1.

The amounts of modifier (B-4) contained in Filtrate 1 (E-15-1) and Filtrate 2 (G-15-1) were 0.4 g and 0 g, respectively.

In a similar manner to Example 1, Flat-plate molding (J-15-1) which was transparent and pale yellow and from which no foreign substances were observed was obtained.

$^1$H-NMR measurement and analysis in a similar manner to Example 1 revealed that the number of the rearrangement structures of the formula (9) per 100 main chain structures of the formula (10) was 0 in Dried Product (F-15-1) and 0.003 in Film (I-15-1).

EXAMPLE 12

100 g of polyphenylene ether (A-1) and 2 g of modifier (B-5) were charged in an autoclave, followed by nitrogen purging and hermetical sealing in a similar manner to Example 1.

The amounts of (A-1) and (B-5) released out of the system upon pressure reduction and nitrogen purging were 0.6 g and 0.5 g, respectively.

The hermetically sealed autoclave was placed in an oil bath set at 130° C., followed by shaking for 5 minutes, whereby 100.0 g of Contents (C-16-1) were obtained in the powdery form.

From a 50 g portion of Contents (C-16-1), Wash 1 (D-16-1), Filtrate 1 (E-16-1), 49.2 g of Dried substance 1 (F-16-1) and Filtrate 2 (G-16-1) were obtained in a similar manner to Example 1.

The amounts of modifier (B-5) contained in Filtrate 1 (E-16-1) and Filtrate 2 (G-16-1) were 0.5 g and 0 g, respectively.

In a similar manner to Example 1, Flat-plate molding (J-16-1) which was transparent and pale yellow and from which no foreign substances were observed was obtained.

$^1$H-NMR measurement and analysis in a similar manner to Example 1 revealed that the number of the rearrangement structures of the formula (9) per 100 main chain structures of the formula (10) was 0 in Dried Product (F-16-1) and 0.004 in Film (I-16-1).

EXAMPLE 13

In a paddle drier ("NPD-16W Type", trade name; product of Nara Machinery Co., Ltd.) equipped with a jacket for heating, 50 kg of polyphenylene ether (A-1) and 2 kg of modifier (B-1) were charged, followed by nitrogen charging inside of the paddle drier.

The jacket was heated to 200° C. over 1 hour by introducing thereinto heated steam.

After the temperature of the jacket reached 200° C., the jacket was kept at this temperature for 2 hours.

Then, cool water was introduced into the jacket for cooling.

From a 50 g portion of Contents (C-17-1), Wash 1 (D-17-1), Filtrate 1 (E-17-1), 49.0 g of Dried substance 1 (F-17-1) and Filtrate 2 (G-17-1) were obtained in a similar manner to Example 1.

The amounts of modifier (B-1) contained in Filtrate 1 (E-17-1) and Filtrate 2 (G-17-1) were 0.3 g and 0 g, respectively.

In a similar manner to Example 1, Flat-plate molding (J-17-1) which was transparent and pale yellow and from which no foreign substances were observed was obtained.

$^1$H-NMR measurement and analysis in a similar manner to Example 1 revealed that the number of the rearrangement structures of the formula (9) per 100 main chain structures of the formula (10) was 0.001 in Dried Product (F-17-1) and 0.0045 in Film (I-17-1).

EXAMPLE 14

In a Henschel mixer ("FM 500", trade name; manufactured by Mitsui Mining Co. Ltd.) permitting jacket heating and cooling, 150 kg of polyphenylene ether (A-1) and 2 kg of modifier (B-1) were charged, followed by purging with nitrogen inside of the mixer.

A stirring blade was turned at a high speed and by shearing heat, the contents were heated to 200° C. over 50 minutes.

After the internal temperature reached 200° C., high-speed rotation was continued for 5 minutes. Cool water was then introduced into the jacket for cooling.

From a 50 g portion of Contents (C-18-1), Wash 1 (D-18-1), Filtrate 1 (E-18-1), 49.3 g of Dried substance 1 (F-18-1) and Filtrate 2 (G-18-1) were obtained in a similar manner to Example 1.

The amounts of modifier (B-3) contained in Filtrate 1 (E-18-1) and Filtrate 2 (G-18-1) were 0.25 g and 0 g, respectively.

In a similar manner to Example 1, Flat-plate molding (J-18-1) which was transparent and pale yellow and from which no foreign substances were observed was obtained.

$^1$H-NMR measurement and analysis in a similar manner to Example 1 revealed that the number of the rearrangement structures of the formula (9) per 100 main chain structures of the formula (10) was 0.001 in Dried Product (F-18-1) and 0.003 in Film (I-18-1).

EXAMPLE 15

In a Henschel mixer ("FM 500", trade name; manufactured by Mitsui Mining Co., Ltd.) permitting jacket heating and cooling, 150 kg of polyphenylene ether (A-1) and 2 kg of modifier (B-1) were charged, followed by purging the inside with nitrogen.

A stirring blade was turned at a high speed and by shearing heat, the contents were heated to 160° C. over 40 minutes.

After the internal temperature reached 160° C., the contents were transferred to a 500-L hopper having an inside purged with nitrogen. After being allowed to stand for one day, they were taken out from the hopper.

From a 50 g portion of Contents (C-19-1), Wash 1 (D-19-1), Filtrate 1 (E-19-1), 49 g of Dried substance 1 (F-19-1) and Filtrate 2 (G-19-1) were obtained in a similar manner to Example 1.

The amounts of modifier (B-1) contained in Filtrate 1 (E-19-1) and Filtrate 2 (G-19-1) were 0.15 g and 0 g, respectively.

In a similar manner to Example 1, Flat-plate molding (J-19-1) which was transparent and pale yellow and from which no foreign substances were observed was obtained.

$^1$H-NMR measurement and analysis in a similar manner to Example 1 revealed that the number of the rearrangement structures of the formula (9) per 100 main chain structures of the formula (10) was 0 in Dried Product (F-19-1) and 0.002 in Film (I-19-1).

The invention claimed is:

1. A modified polyphenylene ether resin which is a reaction product of 100 parts by weight of (A) a polyphenylene ether having a main chain structure of the following formula (1):

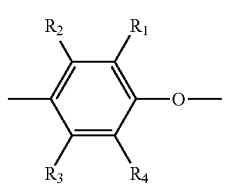

(1)

(wherein $R_1$ and $R_4$ each independently represents hydrogen, a primary or secondary lower alkyl, a phenyl, an aminoalkyl or a hydrocarbonoxy, and $R_2$ and $R_3$ each independently represents hydrogen, a primary or secondary lower alkyl or a phenyl), and 0.01 to 10.0 parts by weight of (B) a modifier selected from dienophilic compounds having one dienophile group, wherein the number of rearrangement structures each represented by the following formula (2):

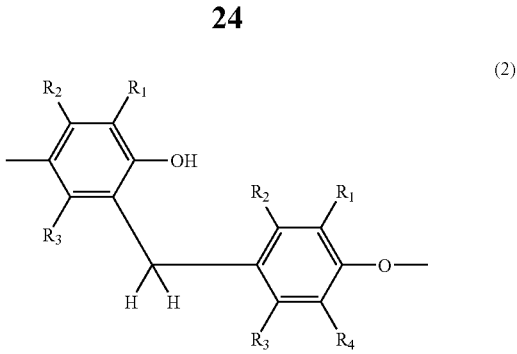

(2)

(wherein $R_1$, $R_2$, $R_3$ and $R_4$ have the same meanings as defined above in the formula (1)) is less than 0.01 per 100 phenylene ether units of the formula (1).

2. The modified polyphenylene ether resin according to claim 1, wherein the number of the rearrangement structures represented by the formula (2) is less than 0.005 per 100 phenylene ether units of the formula (1).

3. The modified polyphenylene ether resin according to claim 1, wherein the modifier (B) is maleic anhydride, maleic acid, fumaric acid, phenyl maleimide, itaconic acid, malic acid, glycidyl acrylate or glycidyl methacrylate.

4. The modified polyphenylene ether resin according to claim 1, which is obtained by reacting 0.2 to 3.0 parts by weight of the modifier (B) with 100 parts by weight of the polyphenylene ether (A).

5. The modified polyphenylene ether resin according to claim 1 wherein the reaction of polyphenylene ether (A) and modifier (B) is carried out in a state where the polyphenylene ether (A) is a solid.

6. The modified polyphenylene ether resin according to claim 1 or 2, which contains no foreign substance.

7. The modified polyphenylene ether resin according to claim 1, wherein the modifier is any one of the dienophilic compounds selected from the group consisting of maleic anhydride, fumaric acid, phenyl maleimide, maleic acid and glycidyl methacrylate.

8. The modified polyphenylene ether resin according to claim 7, wherein the modifier is any one of the dienophilic compounds selected from the group consisting of maleic anhydride, fumaric acid, phenyl maleimide and maleic acid.

9. A modified polyphenylene ether resin which is a reaction product of 100 parts by weight of (A) a polyphenylene ether having a main chain structure of the following formula (1):

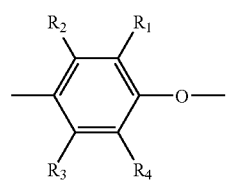

(1)

and 0.01 to 10.0 parts by weight of (B) a modifier selected from the group consisting of dienophilic compounds having one dienophilic group and precursors of the dienophilic compounds, wherein the peak area of the 6.92 ppm of $^1$H-NMR is less than 0.01 per 100 phenylene ether units of the peak area of 6.43 ppm of $^1$H-NMR.

* * * * *